March 22, 1960     J. MARTIN     2,929,587
EJECTION SEATS FOR AIRCRAFT

Filed Feb. 20, 1958     5 Sheets-Sheet 1

INVENTOR
JAMES MARTIN
BY *[signature]*
HIS AGENT

March 22, 1960     J. MARTIN     2,929,587
EJECTION SEATS FOR AIRCRAFT

Filed Feb. 20, 1958     5 Sheets-Sheet 2

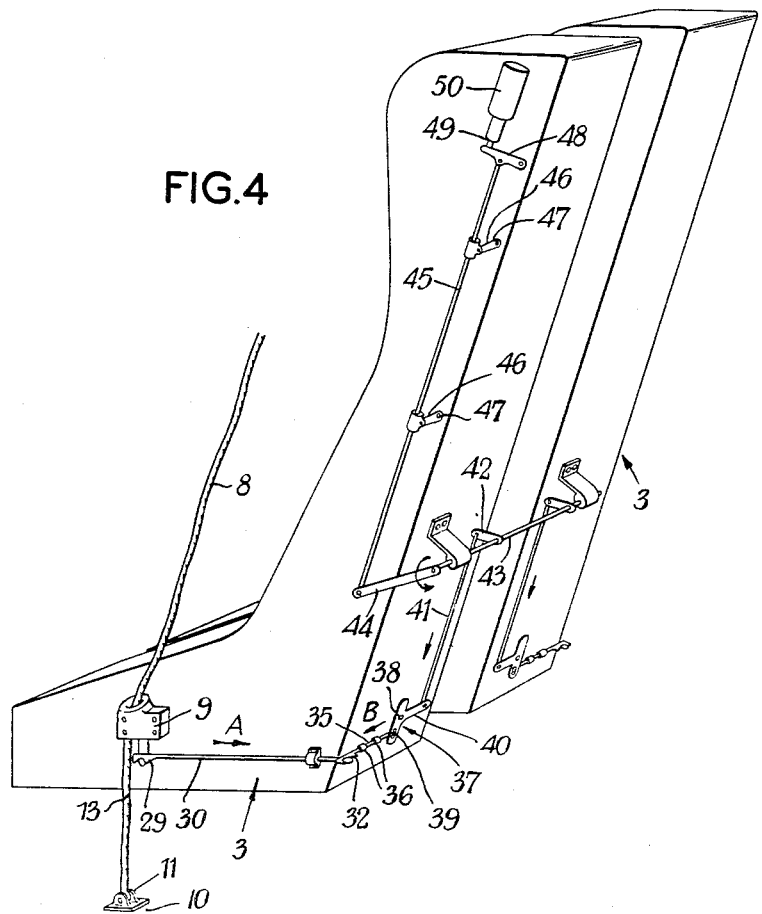

March 22, 1960 J. MARTIN 2,929,587
EJECTION SEATS FOR AIRCRAFT
Filed Feb. 20, 1958 5 Sheets-Sheet 5
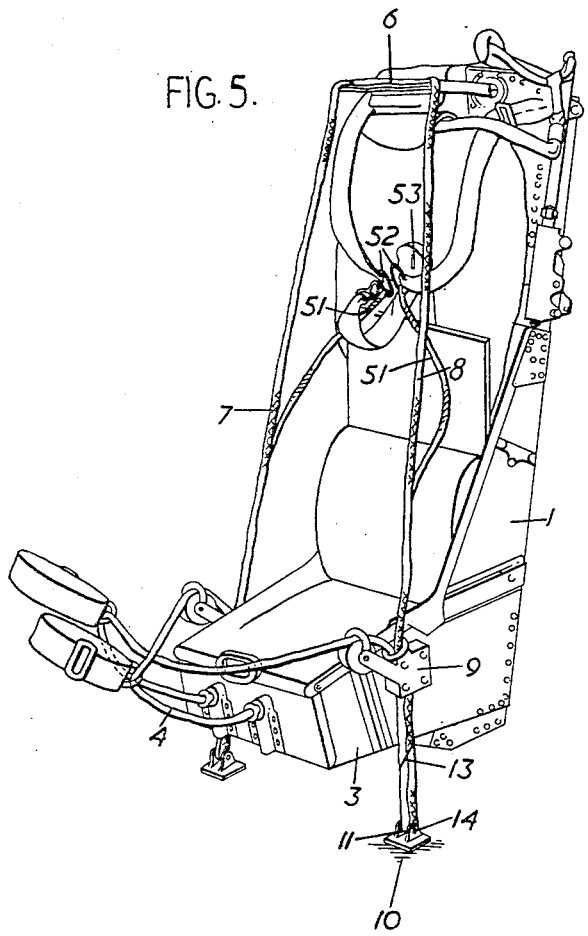
Inventor
JAMES MARTIN
By Kurt Kelman
his AGENT United States Patent Office 2,929,587
Patented Mar. 22, 1960

2,929,587

EJECTION SEATS FOR AIRCRAFT

James Martin, Denham, near Uxbridge, England

Application February 20, 1958, Serial No. 716,304

Claims priority, application Great Britain
February 22, 1957

11 Claims. (Cl. 244—141)

This invention relates to ejection seats for aircraft and, in particular, to an ejection seat of the type which is adapted to be launched from an aircraft, with the occupant seated therein, by means of an ejection unit actuated by an applied force, for example, by pressure generated by one or more explosive cartridges.

A known ejection seat arrangement of this type comprises a frame on which the seat is mounted, a guide fixed in the aircraft so as to be directed towards an outlet through which the seat is to be ejected, an ejector gun operating between the seat frame and a fixed part of the aircraft to project the seat and its frame along the guide, a main parachute, a drogue, harness, harness release means, and means operable as the seat is ejected from the aircraft to carry out automatically, in correct sequence and timing, the operations necessary to allow the airman to descend on the main parachute. To protect the face of the airman during ejection there is provided a flexible face screen having an operating handle which rests normally in a position above and behind the airman's head. Before ejection the airman draws the screen over his head by bringing the screen handle on to his chest, his arms being folded upwards close to the sides of his body. This movement of drawing the screen over the airman's head is utilised to initiate the seat ejecting operations, means being provided for interconnecting the screen with the firing mechanism of the ejection gun. This invention is particularly applicable to an ejection seat arrangement of the form just described.

It has been found that occasionally one or both arms of an airman has or have been injured during his ejection from an aircraft and this is thought to have been caused by the air blast to which the airman is subjected on ejection and which is liable to displace his arms to an extent and in a fashion which may easily cause injury. Moreover, it has been found that in some instances the airman's grip on the flexible face screen has been lost due possibly to the displacement of his arms by the air blast. Loss of the airman's control on the face screen is very undesirable since displacement of the screen could interfere with the proper functioning of the drogue gun of the ejection seat arrangement.

Thus it is one object of the invention to provide means for restraining the arms of the airman during ejection whereby risk of injury thereto is avoided, whilst it is a further object of the invention to provide means to assist the airman in holding the face screen in position during ejection whereby there is avoided or reduced the danger of displacement of the screen and consequential interference with the proper functioning of the drogue gun or other ejector mechanism controlled by the screen.

According to the invention there is provided, in an aircraft ejection seat having a face screen adapted to be drawn by an airman over his head before ejection from the aircraft, means for restraining the arms of the airman against excessive outward displacement whilst holding the said screen over his head during ejection, such means comprising: flexible lines each connected at one part thereof to the said face screen and at another part thereof to a fixed portion of the aircraft so as, when the face screen is pulled over the head of the airman, to lie over the outsides of the airman's arms and, during the initial stages of the launching of the seat from the aircraft, automatically to be drawn taut and to urge the arms of the airman inwardly on to his body; separable means for connecting each of said lines to the said fixed portion of the aircraft and adapted to separate when the tension in said lines exceeds a predetermined value; and means on the ejection seat embracing each of said lines and adapted to retain the latter in their taut condition during ejection and after the disconnection of the lines from the aircraft.

The said arm-restraining lines may be in the form of a single cable, cord, strap, web or of any other appropriate form attached to the said flexible face screen, e.g. looped through the handle of the latter, so as to extend downwardly on each side of the ejection seat or alternatively there may be two separate lines, each attached at one end to the said screen and arranged one on each side of the ejection seat.

Where the ejection seat is arranged for ejection through the upper part of the aircraft, i.e. for upward ejection, the portions of the said lines that are connected to the aircraft may be attached to the floor of the latter but they may be attached to any other suitable fixed portion of the aircraft fuselage below the level of the seat surface of the ejection seat, or they may pass downwardly below said seat surface and under pulleys or the like and then be attached to a fixture above the floor level of the aircraft as described, for example, in my prior Patent No. 2,836,382.

The means on the ejection seat frame for holding the said lines taut during the initial stages of the launching of the seat and after disconnection of the lines from the aircraft may conveniently comprise boxes or snubbing devices (hereinafter called "snubbing boxes") which may conveniently be mounted one on each side of the ejection seat frame, each of these snubbing boxes being designed to permit the passage of the corresponding line therethrough in the direction necessary to tension it for restraining the outward movement of the airman's arms and to hold the face screen down, whilst preventing the withdrawal of the line in the opposite direction. Such snubbing boxes may have manually operable means for releasing the lines when desired.

The disconnection of the said lines from the aircraft after the initial tensioning or tautening of the lines may be achieved by furnishing the lines, at positions between the said snubbing boxes and the points of attachment of the lines to the aircraft, with weakening lines to ensure the shearing or breaking of these lines at the said positions when a predetermined tension is attained in the lines, or alternatively each line may be secured to the aircraft by a spring-loaded or other appropriate releasable connection device adapted to be released on the attainment of the said predetermined tension as described, for example, in my prior Patent No. 2,836,382.

When the seat with the airman has been ejected from the aircraft it is, of course, desirable that there should be no interference with the ready separation of the airman and his parachute equipment from the ejection seat itself, and it is, therefore, desirable that the aforesaid lines should be automatically released from the seat at this stage of the ejection operation and, although this release of the said lines may be achieved in any other appropriate manner, e.g., by releasing the line gripping devices, according to a further feature of the invention, this release may be achieved by rendering the said snubbing boxes detachable from the ejection seat frame and providing means for releasing the snubbing boxes from the seat frame, preferably automatically although manual release means may also be provided.

Conveniently the automatic release of the said snubbing boxes from the ejection seat may be effected by means operated from the time delay or other mechanism controlling the sequential performance of the various steps in the ejection seat launching: in particular, the mechanism used to effect the release of the airman from the seat may be used for this purpose.

In our prior patent specification No. 2,836,382, there is described an ejection seat in which leg-restraining means are provided which consist of lines extending through snubbing boxes to anchorages on the floor of the aircraft (see, for example, Figures 3 and 5). It is within the scope of the present invention to arrange each arm-restraining line as a continuation of or attachment to a corresponding leg-restraining line (where provided) and in such an arrangement each arm-restraining line and its corresponding leg-restraining line may have a common snubbing box and a common anchorage to the aircraft.

In order that the invention may be more readily understood, one embodiment of the same is illustrated, by way of example, in the accompanying drawings in which:

Figure 4 is a diagrammatic perspective view illustrating means for automatically releasing the snubbing box shown in Figure 3 from the ejection seat; and Figure 5 is a further perspective view of an ejection seat, illustrating certain modifications of the invention.

Figure 1:
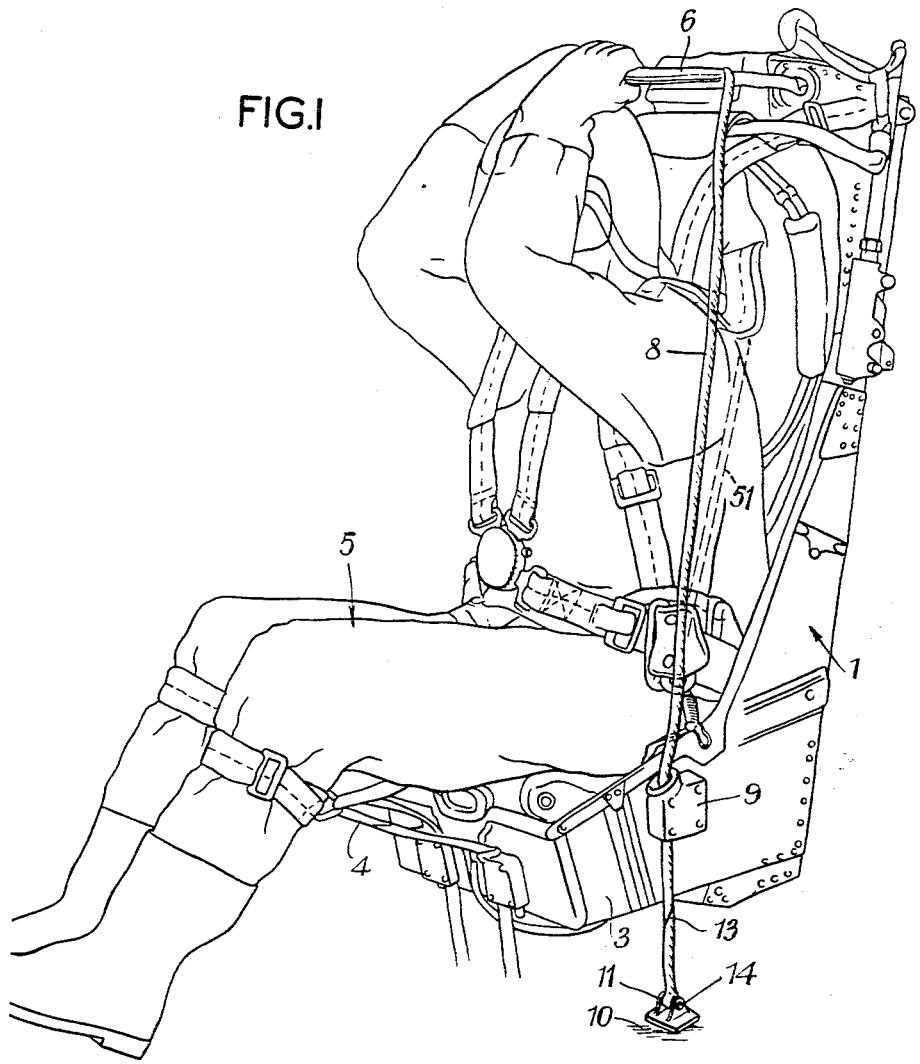
Figure 1 is a perspective view showing an ejection seat for an aircraft and of known form, such seat having this invention applied thereto and the figure showing the airman preparing to draw the face screen over his head preparatory to being ejected from the aircraft.

In the embodiment of the invention illustrated, 1 is the ejection seat, 2 the flexible face screen, 3 the seat frame, 4 the straps or lines of the leg-restraining means such as form the subject of our Patent No. 2,836,382, whilst 5 is the airman. This ejection seat arrangement is known per se, and examples of such arrangements are described and illustrated in our Patents Nos. 2,467,763, 2,527,020, 2,569,638, 2,638,294, 2,708,083 and 2,836,222.

In the embodiment of the invention illustrated, the screen 2 is furnished at its front end with a handle 6 in the form of a substantially oblong loop of which the upper bar is connected to the front end of the screen whilst the lower bar is adapted to be gripped by the airman.

To each end of the upper bar of the looped shaped handle 6 is attached the upper end of an arm-restraining line, of which two are provided, these lines being respectively marked 7 and 8 in the drawings, each such line passing in the construction shown, which is one involving the use of an upwardly ejected seat, downwardly to and through a snubbing box 9 attached to the side of the seat frame 3 below the level of the upper surface of the seat proper, the lines 7 and 8 being attached at their lower ends, after passing through the snubbing boxes 9, to the floor 10 of the aircraft through the medium of brackets 11 or other suitable means.

Each of the snubbing boxes 9 is conveniently of the known type having a spring-loaded toothed cam 12 adapted to grip the line when any tension is applied to it between the snubbing box 9 and the face screen 2 whilst permitting the line to be drawn downwardly through the snubbing box.

The length of each of the lines 7 and 8 is such that when the face screen 2 is in its normal stowed position, the parts of the lines above the snubbing boxes are substantially taut whilst sufficient slack is provided in the lines below the snubbing box to permit any necessary adjustment of the height of the seat to suit any particular airman.

Each of the arm-restraining lines 7 and 8 is provided below its snubbing box with a weakened portion 13 so that the line will part at this position during the ejection of the seat, the load required to achieve this breakage of the arm-restraining lines being more than is sufficient adequately to tension the parts of the lines above the snubbing boxes when the face screen is in its fully withdrawn or down position over the head and face of the airman, but insufficient to cause undue strain or pressure on the chest and arms of the airman.

When the screen handle 6 is drawn forwardly and downwardly on to the airman's chest (the position shown in Figure 2), the arm-restraining lines automatically slacken between the handle 6 and the snubbing boxes 9, but this slack is automatically taken up when the seat rises due to its ejection from the aircraft, the lines being drawn, during the initial ejection stages, downwardly through the snubbing boxes 9 so that the portions thereof between the snubbing boxes and the handle 6 are tautened and pressed tightly against the forearms and/or elbows of the airman so as to apply sufficient restraint to the arms to avoid or reduce the hereinbefore-named dangers of injury to the arms of the airman during his ejection from the aircraft.

Preferably the arrangement is such that, whilst the lines 7 and 8 lie rather to the rear of the airman whilst he is sitting in the ejection seat and the face screen is in its stowed position, nevertheless when the face screen is fully withdrawn over the head of the airman, the lines extend from the handle 6 across the forearms of the airman in front of his elbows.

Although the disconnection of the lower parts of the lines 7 and 8 from the aircraft can be achieved by providing the lines with weakened portions as above described, any other suitable release means may be provided as hereinbefore-mentioned. Thus for example the pins 14 connecting the lines to the brackets 11 could be adapted to shear when a predetermined tension is achieved in the portions of the lines 7 and 8 below the snubbing boxes 9, or spring-loaded releaseable connections adapted to be disconnected at a predetermined tension may be employed as described, for example, in my Patent No. 2,836,382.

The snubbing boxes 9 may be of any appropriate form, but conveniently they are each of a rectangular hollow form open at the upper and lower ends thereof, each box containing one of the said cams 12 which is carried by a lever 15 pivoted on a pin 16 extending from front to rear of the box and surrounded by a helically coiled torsion spring 17 anchored at one end to the lever and at the other end to the box so as always to urge the gripping surface of the cam 12 upwardly into closer line-gripping relation to a fixed gripping surface 18 forming part of the box 9. The lever 15 is also provided with a finger piece 19 projecting from the box 9 to permit the line gripped therein to be released manually when required.

Although the rear end of the face screen 2 will be automatically released from its anchorage to the seat 1 in known manner (see for example British Patent No. 711,234) after the seat has been ejected from the aircraft, it is nevertheless desirable also automatically to disconnect the arm-restraining lines 7 and 8 from the seat frame 3 at this time so as to avoid any interference by such lines with the separation of the airman from the ejection seat.

For this purpose the snubbing boxes 9 are mounted detachably on the seat frame and means are provided for automatically detaching them from this frame at an appropriate stage in the ejection procedure. Very conveniently this automatic ejection may be achieved from the mechanism employed for releasing the pilot from the ejection seat, this mechanism including a strongly loaded spring plunger which is caused to operate at a predetermined moment in the ejection seat launching operations. This mechanism may very conveniently take the form of time delay means of the kind described in my Patent No. 2,708,083.

Figure 3:
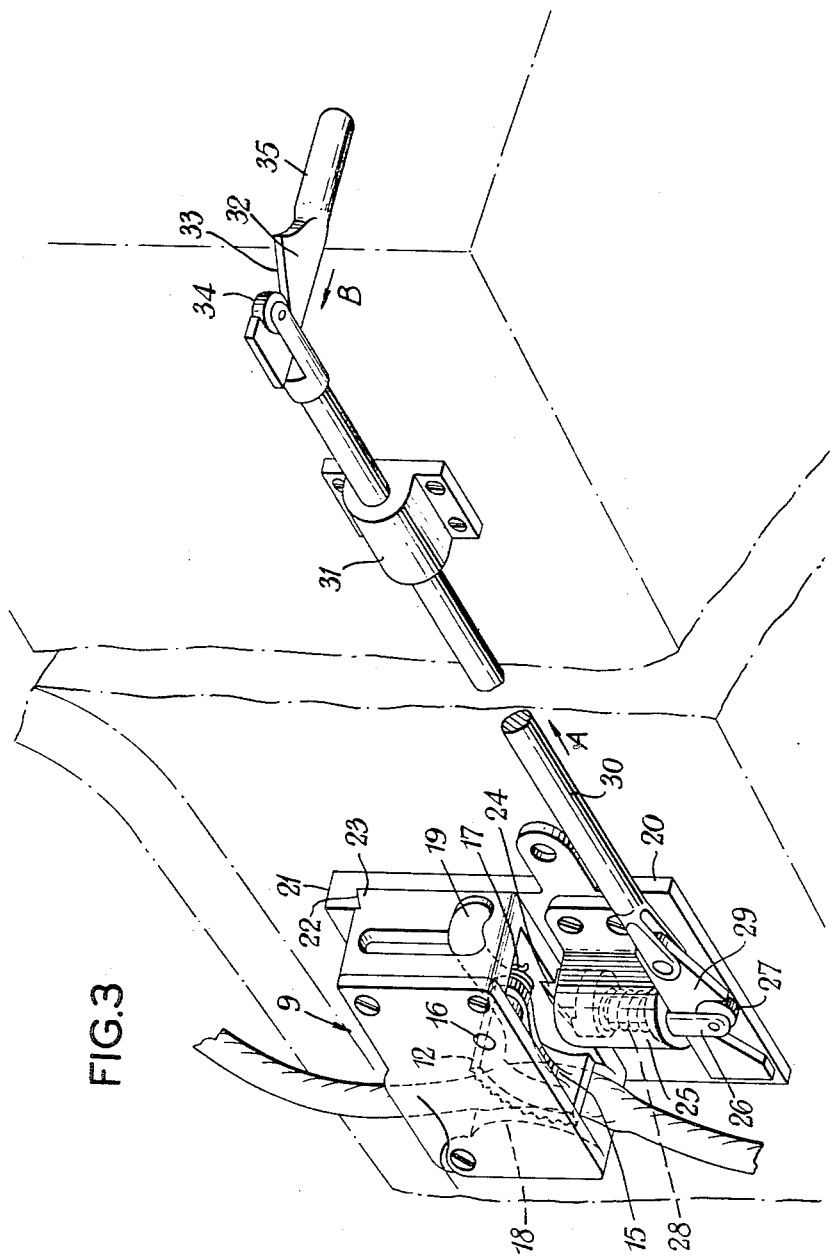
Figure 3 is a perspective view illustrating in detail one of the snubbing boxes shown in Figures 1 and 2.

Although the means of attaching the snubbing boxes 9 releasably to the seat may assume a variety of alternative forms, a convenient and preferred form is shown in Figure 3 of the drawings. As will be seen from this figure, each is mounted detachably on a back plate 20 permanently secured to the side of the seat frame 3. At its upper edge this plate has a forwardly projecting rib 21 having an undercut or groove 22 in its undersurface to receive a mating part or rib 23 on the back of the upper edge of the snubbing box 9 and which is maintained in the said undercut or groove through the medium of a latch 24 mounted for vertical sliding movement in a bracket 25 fixed to the lower front part of the back plate 20, this latch being adapted to engage under the rear wall of the snubbing box to support the latter in engagement with the rib 21 of the plate 20, and also to engage against the front surface of such rear wall to hold the rear of the snubbing box against the plate 20.

The latch 24 has a dependent stem 26 passing downwardly through, and beyond the lower end of, the bracket 25 where the stem is bifurcated and carries a roller 27. A compression spring 28 is arranged around the stem 26 and is engaged at one end with the underside of the latch 24 and at its other end with an internal shoulder in the bracket 25 and is in compression so as always to urge the latch 24 upwards.

In the bifurcated lower end of the stem 26 of the latch 24 is arranged a sear 29 bearing at its upper edge against the lower surface of the bracket 25 and at its under edge upon the upper surface of the roller 27, the said under edge of the sear being profiled to produce a rapid downward withdrawal of the latch 24 to release the snubbing box 9 from the plate 20 when the sear is drawn in the direction of arrow A, Figures 3 and 4, by means of a link 30 to which one end of the sear is pivotally attached.

The end of the link 30 opposite to that to which the sear 29 is connected, is guided for longitudinal sliding movement in a bracket 31 fixed to the side of the seat frame and the rear portion of the link is forked to receive a sear 32 slidable transversely of the link and having a profiled edge 33 bearing against a roller 34 carried in the rear end of the link. The sear 32 is attached to one end of a push rod 35 arranged horizontally for endwise sliding movement in journals 36 within the rear of the seat frame. When the rod 35 is pushed in the direction of arrow B (Figure 4) the link 30 is pulled in the direction of arrow A and the snubbing box 9 is automatically released from the plate 20 and seat frame 3, the snubbing box springing away from the plate 20 under the tension in the corresponding arm-restraining line 7 or 8 at the moment of release of the snubbing box.

The push rod 35 is operated from a T-shaped bell crank lever 37 pivoted at 38 in the back of the seat frame 3 and having a dependent arm connected to the push rod 35 by a pin and slot connection 39. Another arm, 40, of the bellcrank lever is connected to the lower end of a link 41 of which the upper end is connected to a lever arm 42 fixed upon a cross shaft 43 journalled in the upstanding side beams of the seat frame 3. This shaft is connected by lever arm 44, rigidly fixed upon the shaft 43, to the lower end of an operating rod 45 movable up and down and carried by a pair of parallel links 46 pivoted at 47, 47 to the corresponding side beam of the seat frame. The upper end of the rod 45 is attached to the mid-point of a lever 48, also pivoted at one end to the side beam of the seat and at its free end adapted to be operated upon by the plunger 49 of a spring-loaded or fluid pressure-operated jack 50 secured to the seat frame and of which the plunger is automatically released for operation, by a powerful compression spring or by the firing of a cartridge, under the control of delay or other mechanism determining the sequence of operations in the launching of the ejection seat from the aircraft, for example of the kind described in my Patent No. 2,708,083. Very conveniently the jack 50, the rod 45, shaft 43, links 41 and bell crank lever 37 form part of the mechanism serving automatically to disconnect the seat harness from the seat and to permit its separation from the latter at the same time as the airman's body harness is disconnected from the seat as described, for example, in my Patent No. 2,569,638.

It will be appreciated that when the link 41 is moved downwards, the push rod 35 carrying the sear 32 will be moved in the direction of arrow B and the wedge-like action of the sear 32 will cause the movement of the link 30 in the direction of arrow A, thus unlocking the corresponding snubbing box 9 from the frame of the ejection seat.

Figure 2:
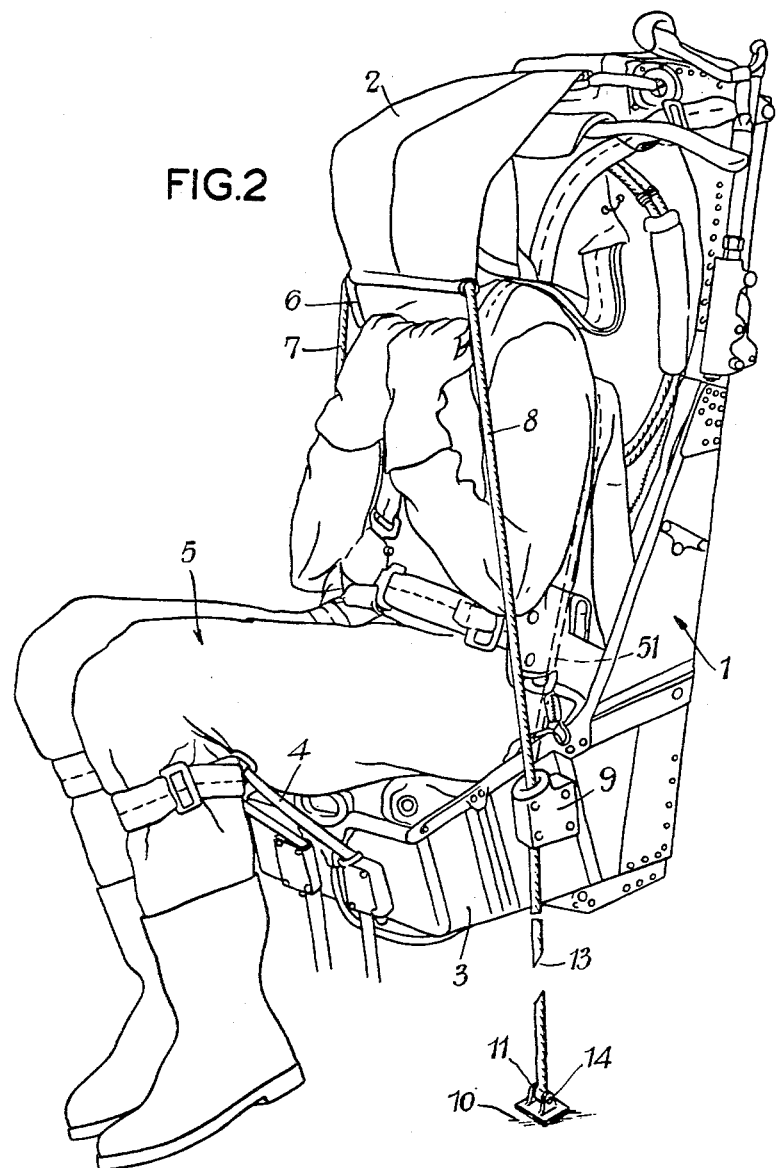
Figure 2 is a view similar to Figure 1 but illustrating a later stage in the ejection operation when the airman has drawn the face screen over his head and face and ejection of the seat has just commenced.

The link 30, sear 32, push rod 35, bell crank lever 37, link 41 and lever arm 42 may be duplicated on the side of the seat frame remote from that seen in Figures 1 and 2, and as diagrammatically illustrated in Figure 4. The lever arm 44, rod 45, plunger 49 and jack 50 and parts connected therewith may also be duplicated if desired.

If desired, manual means may be provided for operating the links 30 to release the snubbing boxes 9 should this be required when servicing the ejection seat or in the event of failure, for any cause, of the jack(s) 50 to operate, and such means may conveniently be of the kind described in my Patent No. 2,569,638.

In an alternative construction, one or more further lines 51 (Fig. 5) may be embodied and may run from the lines 7 and 8 from a position somewhat above the snubbing boxes 9 to the point where the body harness is releasably attached to the seat frame, usually behind the shoulders of the airman, so as automatically to be released from the seat frame at the time of separation of the airman from the seat. The said further lines 51 thus diverge upwardly from the lines 7 and 8 respectively and converge upwardly and inwardly towards one another and to the point of their attachment to the seat frame, where they are secured to rings 52 which are retained in a slot 53 in the seat back by means of a lug 54, the latter being releasably retained in the said slot by a spring urged bolt as described for example in my co-pending application Serial No. 703,405. The lines 51 are preferably arranged so as to engage, when taut, behind the airman's elbows and to restrain the rearward movement of the airman's arms.

Figure 5 also illustrates a modification of the invention, in which leg restraining lines 4 share the snubbing boxes 9 with the arm restraining lines 7 and 8, and are anchored to the aircraft floor 10 with the latter.

It will be apparent that the invention can be variously modified and changed within the scope of the appended claims.

I claim:

1. In an aircraft ejection seat having a face screen adapted to be drawn by an airman over his head before ejection from the aircraft, means for restraining the arms of the airman against excessive outward displacement whilst holding the said screen over his head during ejection, such means comprising: flexible lines each connected at one part thereof to the said face screen and at another part thereof to a fixed portion of the aircraft so as, when the face screen is pulled over the head of the airman, to lie over the outsides of the airman's arms and, during the initial stages of the launching of the seat from the aircraft, automatically to be drawn taut and to urge the arms of the airman inwardly on to his body; separable means for connecting each of said lines to the said fixed portion of the aircraft and adapted to separate when the tension in said lines exceeds a predetermined value; and means on the ejection seat embracing each of said lines and adapted to retain the latter in their taut condition during ejection and after the disconnection of the lines from the aircraft.

2. In an aircraft ejection seat having a face screen adapted to be drawn by an airman over his head before ejection from the aircraft, means for restraining the arms of the airman against excessive outward displacement whilst holding the said screen over his head during ejection, such means comprising: flexible lines each connected at one part thereof to the said face screen and at another part thereof to a fixed portion of the aircraft so as, when the face screen is pulled over the head of the airman, to lie over the outsides of the airman's arms and, during the initial stages of the launching of the seat from the aircraft, automatically to be drawn taut and to urge the arms of the airman inwardly on to his body; separable means for connecting each of said lines to the said fixed portion of the aircraft and adapted to separate when the tension in said lines exceeds a predetermined value; and snubbing boxes detachably mounted on the ejection seat, through which boxes the said lines pass and which maintain the latter taut during the initial stages of the launching of the seat and after the disconnection of said lines from the aircraft.

3. Apparatus as claimed in claim 2, wherein means are provided on the seat adapted automatically to release the said snubbing boxes from the latter at a predetermined stage in the launching of the seat from the aircraft.

4. In an aircraft ejection seat having a face screen adapted to be drawn by an airman over his head before ejection from the aircraft, and mechanism for effecting the release of the airman from the ejection seat, means for restraining the arms of the airman against excessive outward displacement whilst holding the said screen over his head during ejection, such means comprising: flexible lines each connected at one part thereof to the said face screen and at another part thereof to a fixed portion of the aircraft so as, when the face screen is pulled over the head of the airman, to lie over the outsides of the airman's arms and, during the initial stages of the launching of the seat from the aircraft, automatically to be drawn taut and to urge the arms of the airman inwardly on to his body; separable means for connecting each of said lines to the said fixed portion of the aircraft and adapted to separate when the tension in said lines exceeds a predetermined value; snubbing boxes detachably mounted on the ejection seat, through which boxes the said lines pass and which maintain the latter taut during the initial stages of the launching of the seat and after the disconnection of said lines from the aircraft; and means on the seat adapted automatically to release the said snubbing boxes from the latter, such means being controlled from the mechanism for effecting the release of the airman from the seat.

5. Apparatus as claimed in claim 4, and including latches on the ejection seat adapted normally to retain the said snubbing boxes on the latter, release of such latches being controlled from the mechanism for effecting the release of the airman from the seat.

6. Apparatus as claimed in claim 1, wherein said separable means comprise spring-loaded connection devices.

7. Apparatus as claimed in claim 1, wherein each of said lines is formed with a weakened portion between its connection to the said fixed portion of the aircraft and said line embracing means, whereby the line will break at this weakened portion when subjected to tension in excess of a predetermined value.

8. In an aircraft ejection seat having a face screen adapted to be drawn by an airman over his head before ejection from the aircraft, means for restraining the arms of the airman against excessive outward displacement whilst holding the said screen over his head during ejection, such means comprising: flexible lines each connected at one part thereof to the said face screen and at another part thereof to a fixed portion of the aircraft so as, when the face screen is pulled over the head of the airman, to lie over the outsides of the airman's arms and, during the initial stages of the launching of the seat from the aircraft, automatically to be drawn taut and to urge the arms of the airman inwardly on to his body; separable means for connecting each of said lines to the said fixed portion of the aircraft and adapted to separate when the tension in said lines exceeds a predetermined value; snubbing boxes detachably mounted on the ejection seat, through which boxes the said lines pass and which maintain the latter taut during the initial stages of the launching of the seat and after the disconnection of said lines from the aircraft; and leg restraining lines each connected at one part thereof to loops adapted to pass around the airman's legs and at another part thereof to the said fixed portion of the aircraft, and passing through the said snubbing boxes intermediate said parts so as to operate in conjunction with and in a similar manner to said arm restraining lines.

9. An ejection seat arrangement for aircraft comprising a frame on which the seat is mounted, a guide carrying said seat frame and fixed in the aircraft so as to be directed towards an outlet through which the seat is to be launched, an ejector gun operating between the said seat frame and a fixed part of the aircraft to project the seat and its frame along the said guide, a main parachute, a drogue, airman's harness, harness release means, a face screen adapted to be drawn over the head of the airman preparatory to the ejection of the said seat from the aircraft and adapted, on being so drawn over the airman's head, to operate mechanism for automatically effecting, in correct sequence and timing, the operations necessary to eject the seat from the aircraft, to release the said drogue, main parachute and then to release the airman from the seat, and means automatically to restrain the arms of the airman whilst holding the said face screen from being outwardly displaced by air blast, such means comprising flexible lines connected at one part to the said face screen and at another part to a fixed portion of the aircraft but automatically disconnectible from the latter when a predetermined tension in the lines is exceeded during launching of the ejection seat from the aircraft, such lines being adapted automatically to be drawn tight and to urge the arms of the airman inwardly on to his body during said launching, and means being provided on the ejection seat to retain said lines in this taut condition during such ejection and after the disconnection of the lines from the aircraft.

10. In an aircraft ejection seat having a face screen adapted to be drawn by an airman over his head before ejection from the aircraft, means for restraining the arms of the airman against excessive outward displacement whilst holding the said screen over his head during ejection, such means comprising: flexible lines each connected at one part thereof to the said face screen and at another part thereof to a fixed portion of the aircraft so as, when the face screen is pulled over the head of the airman, to lie over the outsides of the airman's arms and, during the initial stages of the launching of the seat from the aircraft, automatically to be drawn taut and to urge the arms of the airman inwardly on to his body; separable means for connecting each of said lines to the said fixed portion of the aircraft and adapted to separate when the tension in said lines exceeds a predetermined value; means on the ejection seat embracing each of said lines and adapted to retain the latter in their taut condition during ejection and after the disconnection of the lines from the aircraft; and additional lines attached one to each of the said arm restraining lines at points located (in the taut condition of the arm restraining lines) somewhat above the said line embracing means, and converging upwardly and rearwardly towards one another and being releasably secured to the seat back.

11. Apparatus as claimed in claim 10, and including airman's body harness having a part thereof releasably secured to the seat in the region of the airman's shoulders the said additional lines being secured to the seat at the same point as the body harness and being releasable therewith.

References Cited in the file of this patent

UNITED STATES PATENTS

| | | |
|---|---|---|
| 2,457,252 | Martin | Dec. 28, 1948 |
| 2,527,020 | Martin | Oct. 24, 1950 |
| 2,528,532 | Martin | Nov. 7, 1950 |
| 2,726,054 | Lesley et al. | Dec. 6, 1955 |
| 2,829,850 | Culver | Apr. 8, 1958 |
| 2,836,382 | Martin | May 27, 1958 |